United States Patent [19]

Chu

[11] Patent Number: 5,988,323
[45] Date of Patent: Nov. 23, 1999

[54] BRAKE STRUCTURE FOR CASTERS

[76] Inventor: Keio Chu, P.O.Box. 63-150, Taichung, Taiwan

[21] Appl. No.: 09/039,180

[22] Filed: Mar. 16, 1998

[51] Int. Cl.[6] .................................................... B60B 33/00
[52] U.S. Cl. ........................................ 188/1.12; 16/35 R
[58] Field of Search ............................ 188/1.12, 31, 69, 188/19, 20, 265; 16/35 R

[56] References Cited

U.S. PATENT DOCUMENTS

| | | | |
|---|---|---|---|
| 1,633,638 | 6/1927 | Jarvis et al. | 188/1.12 |
| 2,709,828 | 6/1955 | Noelting et al. | 188/1.12 |
| 4,349,937 | 9/1982 | Fontana | 16/35 R |
| 4,720,893 | 1/1988 | Mellwig et al. | 16/35 R |
| 4,941,552 | 7/1990 | Screen | 188/1.12 |
| 4,985,960 | 1/1991 | Zun | 188/1.12 |
| 5,014,391 | 5/1991 | Schulte | 16/35 R |
| 5,799,366 | 9/1998 | Zocco et al. | 16/35 R |

*Primary Examiner*—Chris Schwartz
*Assistant Examiner*—Thomas J. Williams

[57] ABSTRACT

An improved brake structure for casters including a caster frame having a through pivot hole, two rollers mounted pivotally at the ends of the through pivot hole of the caster frame and having inner teeth, a rotary shaft pivotally mounted at a rear end of the caster frame to support an object such as a leg of a table or chair, a trigger element pivotally mounted at a front end of the caster frame, a first stop element for stopping the relative movement of the inner teeth of the rollers, a first spring element for urging the first stop element. The brake structure is characterized in that a second stop element is pivotally disposed below the trigger element and capable of horizontal displacement. The second stop element includes a front urging portion and a rear bent baffle wall. The trigger element further includes a trigger tab extending downwardly therefrom. When the trigger element deflects, the trigger tab will push the baffle wall. A second spring element is provided to urge against the second stop element. A stop ring is further provided at a rear end of the rotary shaft relative to the front end of the second stop element. The stop ring is provided with at least two notches at its outer periphery. The front urging end of the second stop element may engage the notches to achieve synchronous braking of the rollers and the rotary shaft.

3 Claims, 4 Drawing Sheets

5,988,323

BRAKE STRUCTURE FOR CASTERS

BACKGROUND OF THE INVENTION (a) Field of the Invention

The present invention relates generally to a caster, and more particularly to an improved brake for casters.

(b) Description of the Prior Art

Casters enable tables, chairs, etc., to move along surfaces with convenience. They are also equipped with brakes to stop their movement when desired to keep them fixed in position. With reference to FIG. 1, a conventional caster is comprised of a caster frame 1, having a through hole 1A. A roller 2 is pivotally provided at both sides of the through hole 1A. The inner circumference of the roller 2 is provided with a plurality of teeth 2A. The rear side of the caster frame 1 is provided with a rotary shaft 3 capable of free rotation. The bottom end of the rotary shaft 3 is fixedly provided with a gear 4. The front side of the caster frame 1 is pivotally provided with a trigger element 5 that can be pulled upwardly or downwardly. A stop element 6 is pivotally disposed below. The stop element 6 is punched into a V-shape having a pivot 6A in the middle, both sides or arms thereof being capable of swinging movement about the pivot 6A. The left end of the stop element 6 is bent upwardly to form a forked projecting insert portion 7 which may engaging the teeth at both sides of the gear 4. The right end of the stop element 6 is bent to form a support portion 8, an elastic plate 9 being disposed at the back side of the support portion 8 an integrally punched therewith. A spring 9A is also disposed at one side of the support portion 8 to provide the support portion 8 with a lateral resilient force. When the trigger element 5 is pulled upwardly, the support portion 8 compresses the elastic plate 9. When the trigger element 5 is pulled downwardly, releasing its force on the support portion 8, the resilience of the elastic plate 9 will push it upward to engage with the teeth 2A of the roller 2 for positioning purposes. However, in actual operation, since the stop element 6 is supported at the pivot to urge upwardly, it may deform in shape due to metal fatigue so that the insert portion 7 cannot easily align with the gear 4. Furthermore, the compression pitch of the elastic plate 9 may be too small so that the reset tension is unstable and inadequate, thus the stopping effects on the roller 2 and the gear 4 of the rotary shaft 3 are not good. The stop element 6 may easily break due to metal fatigue through prolonged use.

SUMMARY OF THE INVENTION

A primary object of the present invention is to provide an improved brake for casters, in which the braking operation is convenient and the brake will not be easily damaged.

In order to achieve the above-mentioned object, the improved brake for casters according to the present invention comprises a caster frame having a through pivot hole so that two rollers can be respectively secured to both sides of the caster frame at both ends of the through pivot hole. Each roller is provided with inner teeth at its inner circumference. The rear side of the caster frame is pivotally provided with a rotary shaft capable of free rotation and adapted to be coupled to an object such as a leg of the table or chair. The front side of the caster frame is provided with a trigger element capable of upwardly and downward manipulation. The trigger element includes an urging portion at an extreme end. One side of the trigger element is urged by first stop element urged by a first spring element such that the first stop element can be controlled by the urging portion to stop the relative movement of the inner teeth of the rollers. The invention is characterized in that a second stop element capable of horizontal displacement is disposed below the trigger element. The second stop element is provided with a front urging end and a rear bent baffle wall. The trigger element further includes a downwardly extending trigger tab for pushing the baffle wall when the trigger element deflects. A second spring element is disposed below the second stop element to provide it with the necessary resetting force. A stop ring is disposed at a rear end of the rotary shaft relative to the front end of the stop element. The outer periphery of the stop ring is provided with at least two opposite notches which the front urging end of the second stop element can engage. By means of the above arrangement, the rollers and the rotary shaft can be synchronously braked.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
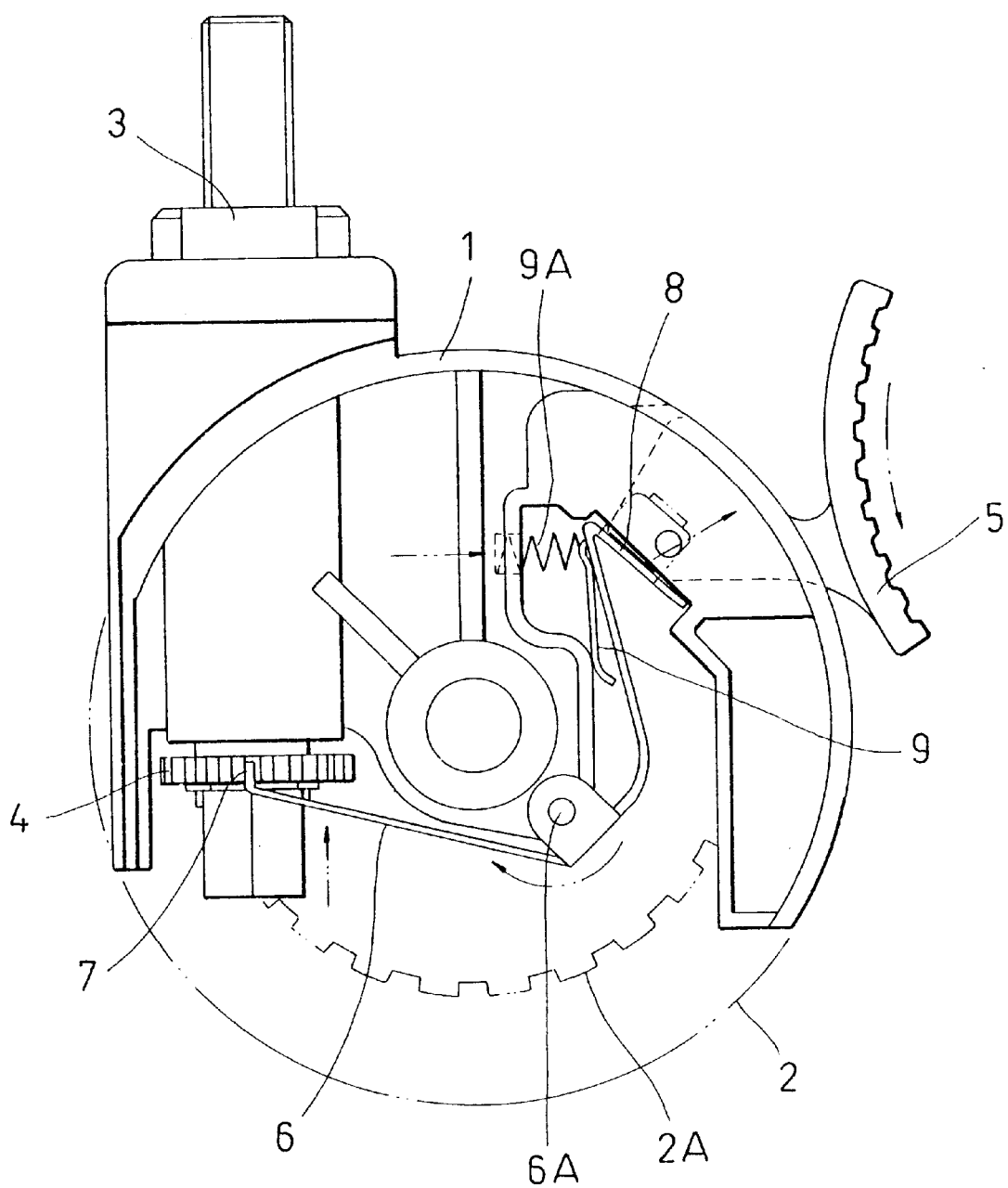
FIG. 1 is a schematic view of the prior art.
Figure 2:
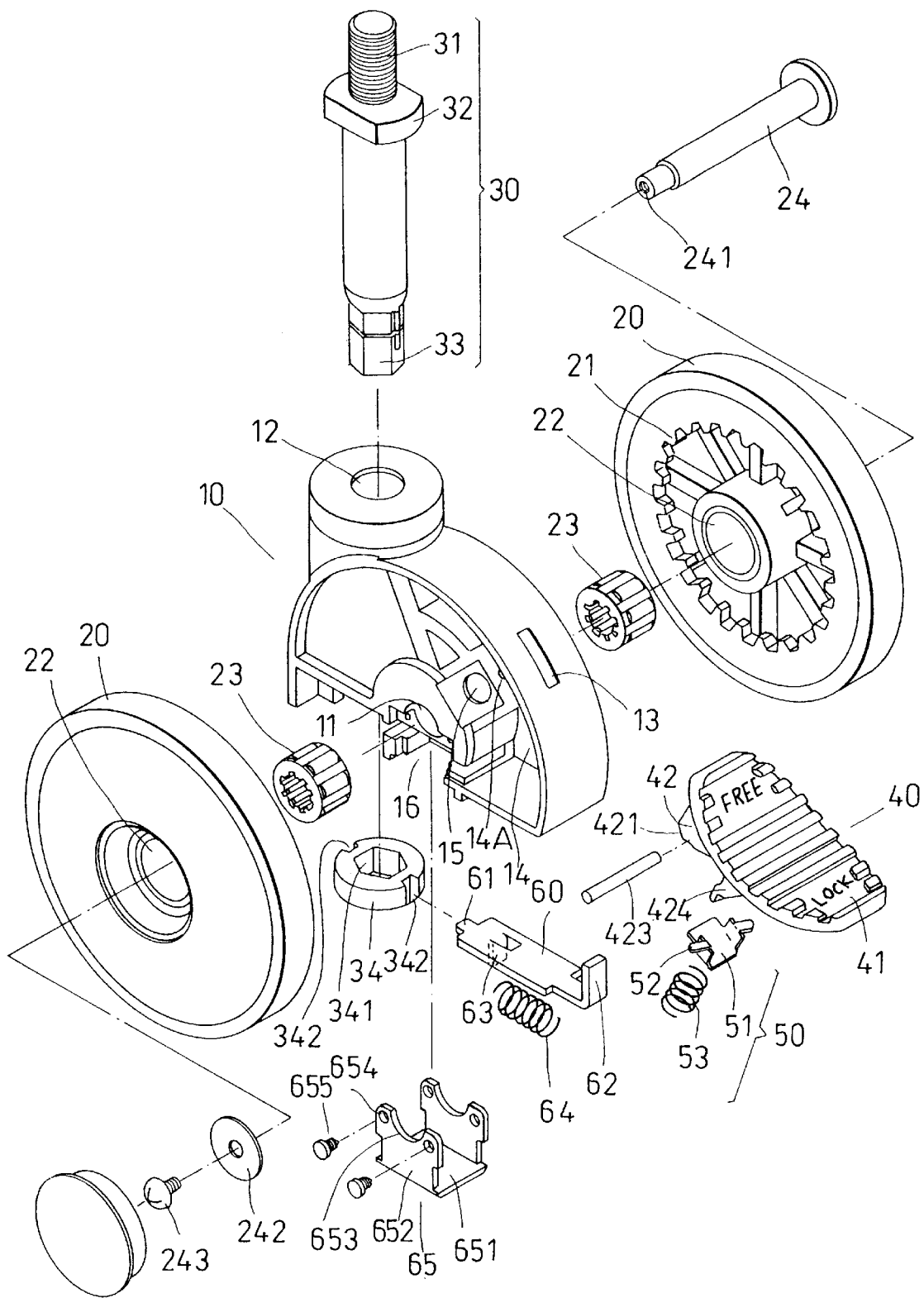
FIG. 2 is a perspective exploded view of a preferred embodiment of the present invention.

Referring to FIG. 2, the improved brake for casters according to the present invention comprises a caster frame 10, two rollers 20, a rotary shaft 30, a trigger element 40, a first stop element 50 and a second stop element 60.

As shown, the caster frame 10 is provided with a through pivot hole 11 running from side to side for mounting of the rollers 20. A rear side of the caster frame 10 is provided with a projecting pivot seat 12 in the form of a post for receiving and positioning the rotary shaft 30. A front side of the caster frame 10 is provided with a slot 13. Inside the caster frame 10 below the slot 13 is a receiving space 14 provided with a pivot hole 14A for mounting of the trigger element 40. A receiving recess 15 is laterally provided of the receiving space 14 inside the caster frame 10 for receiving and positioning the first stop element 50. A mounting space 16 is further disposed below the through pivot hole 11 f or mounting of the second stop element 60.

The two rollers 20 are respectively coupled onto both sides of the caster frame 10 and face each other with their inner sides. The inner circumference on the inner side of each roller 20 is provided with inner, teeth 21 with a pivot mounting hole 22 at the center. spindle 24 with a head portion is passed through the respective pivot mounting holes 22 of the rollers 20 and the through pivot hole 11 of the caster frame 10 to mount two shafts 23 in the respective pivot mounting holes 22 at both sides of the through pivot hole 11. The spindle 24 has a screw hole 241 at one end and is locked in position after passing the pivot mounting holes 22 by means of a packing ring 242 and a screw 243.

The rotary shaft 30 is a substantially cylindrical rod that passes through the center hole of the pivot seat 12 on the caster frame 10. The rotary shaft 30 has outer threads 31 at an upper end thereof adapted to screwably couple with the bottom side of an object such as a cart. A stop portion 32 is disposed below the outer threads 31 for baffling against top side of the pivot seat 12. A lower end of the rotary shaft 30 is provided with a hexagonal drive portion 33. After the rotary shaft 30 is inserted through the pivot seat 20, it is secured with a stop ring 34 having a hexagonal securing hole 341 at its center and at least two notches 342 at its outer periphery for engaging the second stop element 60.

The trigger element 40 includes a trigger portion. 41 that can be manipulated by hand, and a plate portion 42 extending from the bottom end of the trigger portion 41. The extreme end of the plate portion 42 is provided with an urging portion 421 the upper end of which is provided with a pin hole 422 for receiving a positioning pin 423 mounted in the pivot hole 14A of the caster frame 10, so that the trigger element 40 received in the slot 13 may deflect about the pivot. The lower side of the plate portion 42 further extends downwardly to form a cantilever-like trigger tab 424 for manipulation by the user.

The first stop element 50 is punched from metal to form an inverted U-shaped seat including an urging side 51 in the middle, and two bent lateral sides forming respective urging ends 52 for corresponding to the inner teeth 21 of the rollers 20. The first stop element 50 is installed below the urging portion 421 of the trigger element 40 and is being urged thereby when the urging portion 421 biases. The bottom side of the urging side 51 is abutted by a spring 53 mounted in the receiving slot 15 and therefor provided with a resetting tension. When the trigger element 40 deflects so that its urging portion 421 urges against the urging side 51, the latter is depressed so that it disengages from the inner teeth 21 of the rollers 20. Furthermore, when the trigger element 20 is operated in a reverse direction so that the urging side 51 is released from the action of the urging portion 421, the spring 53 will push the urging ends 52 of the first stop element 50 to engage upwardly the inner teeth 21 to stop the rotation of the rollers 20.

The second stop element 60 is also punched from metal. It is mounted in the mounting space 16 below the through pivot hole 11 of the caster frame 10 such that it can horizontally displace. It includes a front urging end 61 that matches the notches 342 of the stop ring 34 and a baffle wall 62 that bends upwardly from its rear end, against which the trigger tab 424 may rest and push when the trigger element 40 deflects. The bottom side of its middle section is punched to form a downwardly projecting limit portion 63. A spring 64 is provided laterally of the limit portion 63 to provide the limit portion 63 with a lateral resetting force. An inverted U-shaped clamp seat 65 is further disposed below the second stop element 60 and includes a support base 651 and two vertical sides 652. The upper end of each vertical side 652 is provided with a curved notch 653, and securing holes 654 one on each end. Screws 655 are used to tighten the clamp seat 65 to the caster frame 10. In this way, the second stop element 60 may be kept to always displace horizontally to utilize the front urging end 61 to engage or disengage from the notches 342 of the stop ring 34.

Figure 3:
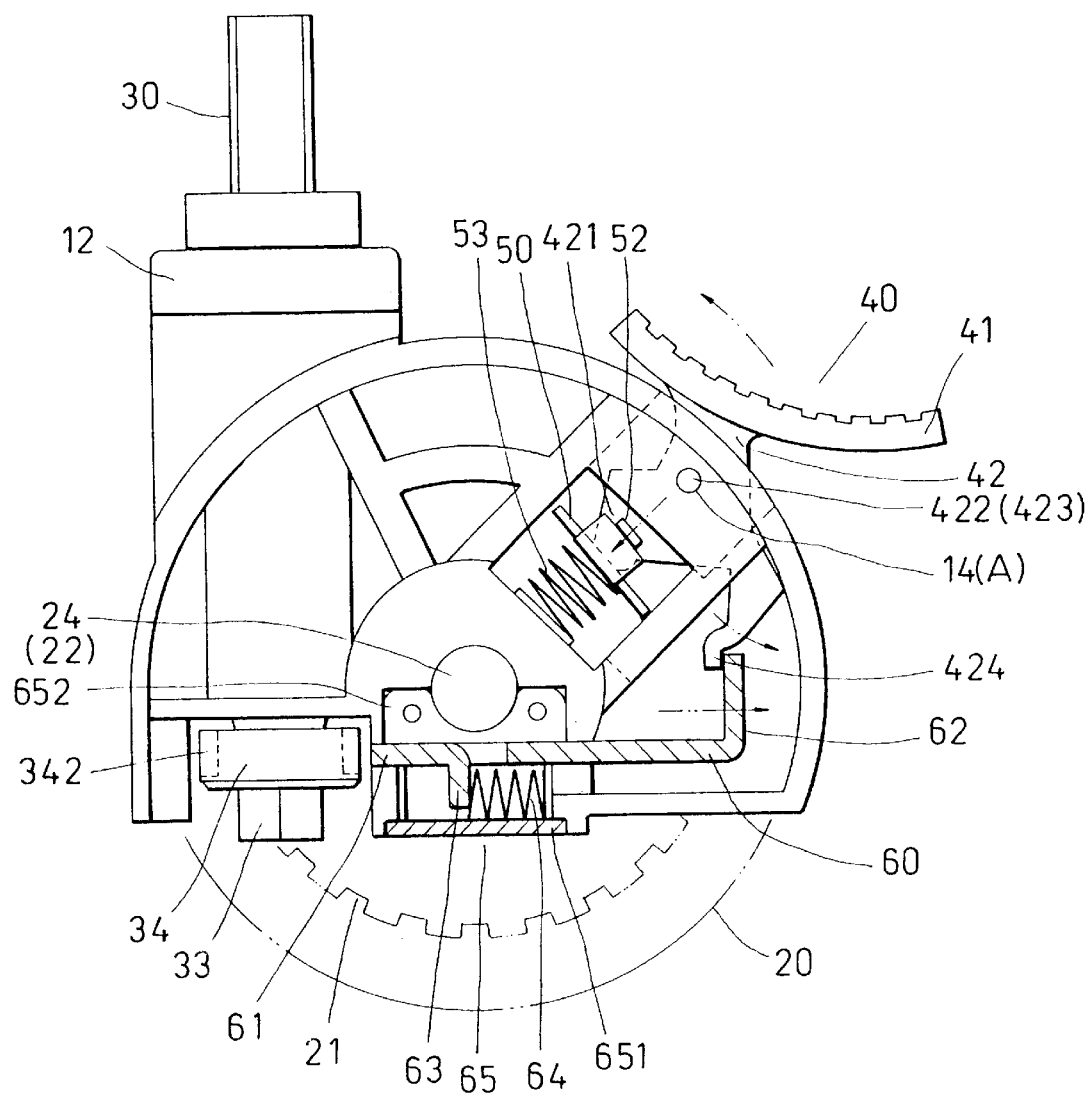
FIG. 3 is an assembled plan view of the preferred embodiment of the present invention.

Referring to FIG. 3, in order to operate the caster of the invention under normal circumstances, i.e., the rollers 20 may freely move to and fro or rotate about the rotary shaft 30 through 360 degrees, the trigger element 40 is pulled upwardly to its highest point so that its urging portion 421 presses downwardly on the urging side 51 of the first stop element 50, causing the urging ends at both sides to disengage downwardly from the inner teeth 21. Hence, the two rollers 20 may freely rotate, in which the spring 53 is in a compressed state. On the other hand, since the trigger element 40 is pulled upwardly, the trigger tab 424 at its lower end swing downwardly with the pin hole 422 as center. Therefore, the baffle wall 62 resting against the trigger tab 424 will bear a rearward horizontal pulling force, as indicated by the arrow shown in the drawing. At the same time, the second stop element 60 is pushed rearwardly and horizontally so that the front urging end 61 disengages from the notch 342 of the stop ring 34, allowing the entire caster to freely rotate about 360 degrees with the rotary shaft 30 as center. The table or chair or cart supported on the casters of the invention can then freely move along the ground surface.

Figure 4:
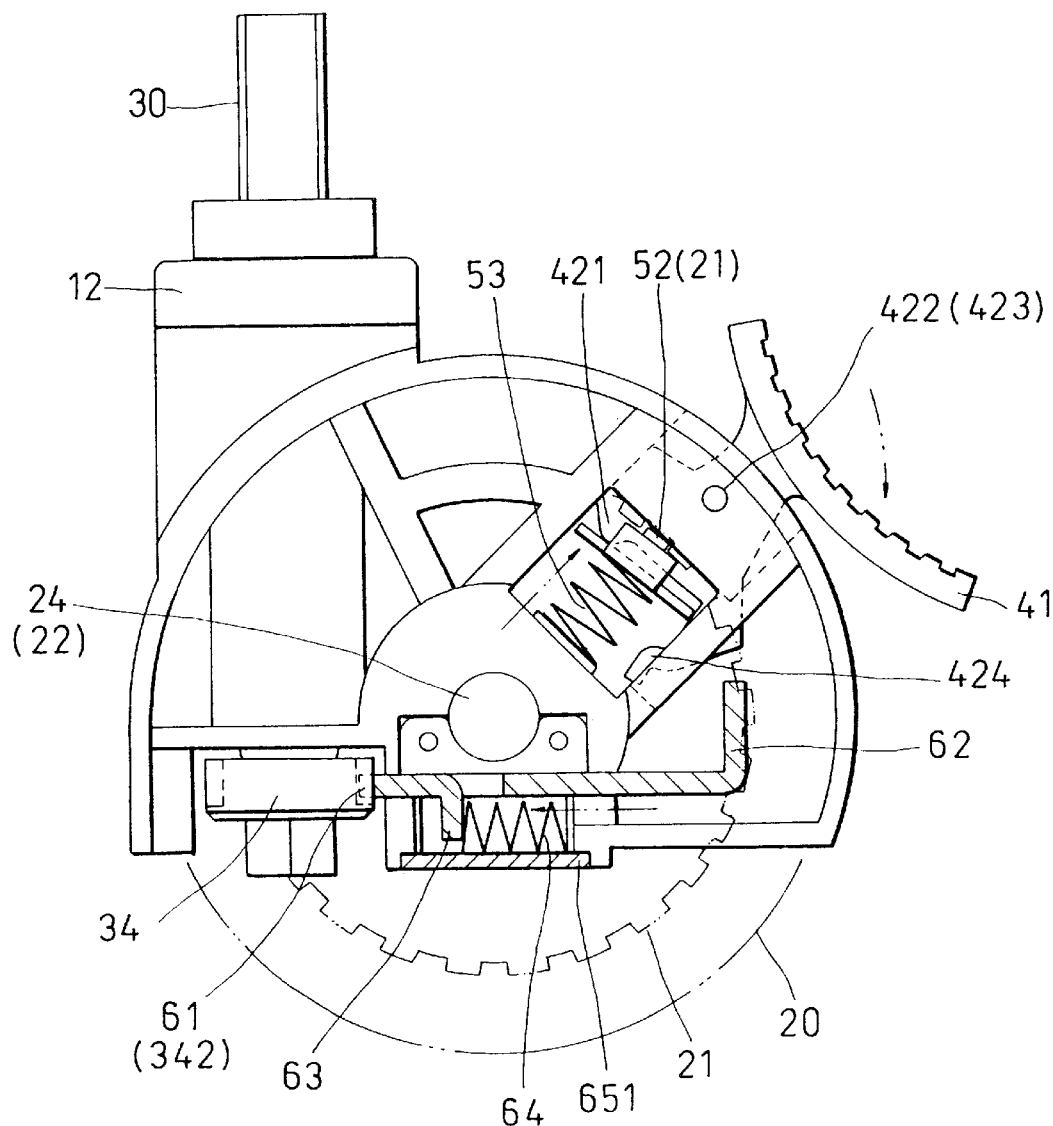
FIG. 4 is a schematic view of the braking operation according to the present invention.
Figure 5:
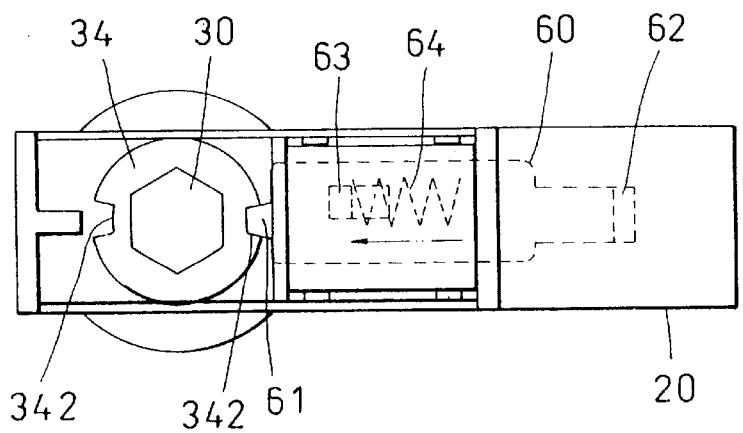
FIG. 5 is a schematic view illustrating the linear braking of the roller according to the present invention.

Furthermore, with reference to FIG. 4, when it is desired to fix the casters in position, the trigger element 40 is pulled downwardly to its lowest point, so that urging portion 421 of the trigger element 40 may swing upwardly to disengage from the pressure exerted by the urging side 51 of the first stop element 50. The spring 53 below the first stop element 50 and originally compressed thereby then urges upwardly against the first stop element 50 due to its resetting force. Hence, the urging ends 52 at both sides of the first stop element 50 engage the inner teeth 21 of the rollers 20, stopping the rollers 20 from further movement. At the same time, since the trigger tab 424 follows the trigger element 40 to displace upwardly to disengage from the baffle wall 62, the second stop element 60 is pushed by the spring 64 to quickly advance forward to the stop ring 34. Then, by turning the rollers 20 a little sideways to cause the notch 342 to align with the front urging end 61 of the second stop element 60, the rollers 20 can be maintained in a state in which they can only be positioned in a fixed linear direction, as shown in FIG. 5. Certainly, the stop ring 34 may be provided with more notches to allow quicker positioning effects.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved brake structure for casters, comprising:

a caster frame having a through pivot hole;

two rollers, pivotally mounted at both sides of said caster frame at the ends of said through pivot hole; said rollers each having an inner side the circumference of which is provided with a plurality of inner teeth;

a rotary shaft, pivotally mounted at the rear side of said caster frame and adapted to support an object such as a leg of a table or chair;

a trigger element, pivotally mounted at the front end of said caster frame and capable of upward and downward pivotal movement, said trigger element including an urging portion at an extreme end;

a first stop element, urging against one side of said urging portion of said trigger element, said first stop element being urged by said urging portion to stop the relative movement of said inner teeth of said rollers;

and a first spring element, urging against said first stop element, wherein a second stop element is pivotally provided below said. trigger element and capable of horizontal displacement, said second stop element having a front urging end and a rear bent baffle wall; and said trigger element further has a trigger tab extending downwardly and integrally from a bottom side thereof, said trigger tab capable of pushing said baffle wall when said trigger element deflects, a second spring element being disposed below said second stop element to provide it with the necessary resetting force, a stop ring being further disposed at an extreme end of said rotary shaft relative to said front urging end of said second stop element, said stop ring having an outer periphery provided with at least two opposite notches, which said front urging end of said second stop element may engage to achieve synchronous brake of said rotary shaft and said rollers.

2. An improved brake structure for casters as defined in claim 1, wherein said second stop element is provided with a limit portion that extends integrally and downwardly from a bottom side of said second stop element, against which said second spring element may horizontally urge and compress.

3. An improved brake structure for casters as defined in claim 1, wherein said second stop element and said second spring element are both limited and positioned by an inverted U-shaped clamp seat disposed below said rollers.

* * * * *